US011732426B2

(12) United States Patent
Johnson et al.

(10) Patent No.: US 11,732,426 B2
(45) Date of Patent: Aug. 22, 2023

(54) SYSTEMS AND METHODS FOR COUNTING WORK MACHINE BIT REMOVAL

(71) Applicant: Caterpillar Paving Products Inc., Brooklyn Park, MN (US)

(72) Inventors: Nicholas B. Johnson, Dayton, MN (US); Jameson Michael Smieja, Mound, MN (US)

(73) Assignee: Caterpillar Paving Products Inc., Brooklyn Park, MN (US)

( * ) Notice: Subject to any disclaimer, the term of this patent is extended or adjusted under 35 U.S.C. 154(b) by 269 days.

(21) Appl. No.: 17/119,741

(22) Filed: Dec. 11, 2020

(65) Prior Publication Data

US 2022/0184757 A1 Jun. 16, 2022

(51) Int. Cl.
| | | |
|---|---|---|
| *E01C 23/088* | (2006.01) | |
| *B23P 19/02* | (2006.01) | |
| *B23P 19/027* | (2006.01) | |
| *E01C 23/12* | (2006.01) | |
| *B25B 27/02* | (2006.01) | |
| *B25B 28/00* | (2006.01) | |
| *B28D 1/18* | (2006.01) | |
| *E21C 35/18* | (2006.01) | |

(52) U.S. Cl.
CPC .......... *E01C 23/088* (2013.01); *B23P 19/025* (2013.01); *B23P 19/027* (2013.01); *B25B 27/026* (2013.01); *B25B 28/00* (2013.01); *E01C 23/127* (2013.01); *B28D 1/188* (2013.01); *E21C 35/188* (2020.05)

(58) Field of Classification Search
CPC .... E01C 23/088; E01C 23/127; E21C 35/188; E21C 35/19; E21C 35/191; E21C 35/197; B28D 1/188; E02F 9/2891; B23P 19/025; B23P 19/027; B25B 27/026; B25B 28/00
See application file for complete search history.

(56) References Cited

U.S. PATENT DOCUMENTS

| | | | |
|---|---|---|---|
| 2012/0176251 A1 | 7/2012 | Klass et al. | |
| 2017/0028536 A1* | 2/2017 | Lefavour | B25B 27/146 |
| 2017/0087709 A1* | 3/2017 | Barezzani | B25B 27/146 |
| 2019/0168365 A1* | 6/2019 | Weber | H01R 43/0488 |
| 2019/0184534 A1* | 6/2019 | Berning | B25B 27/04 |
| 2019/0360333 A1* | 11/2019 | Barimani | G05D 1/0219 |
| 2020/0106230 A1* | 4/2020 | White | H01R 43/0486 |
| 2020/0238487 A1* | 7/2020 | Kanack | G01M 99/008 |

FOREIGN PATENT DOCUMENTS

| | | |
|---|---|---|
| CN | 203712799 U | 7/2014 |
| JP | 2004082250 A | 3/2004 |

* cited by examiner

*Primary Examiner* — Janine M Kreck
*Assistant Examiner* — Michael A Goodwin
(74) *Attorney, Agent, or Firm* — Schwegman, Lundberg & Woessner

(57) ABSTRACT

A method of removing cutting bits from a milling work machine includes engaging a cutting bit connected to a rotary drum of the machine with a bit removal tool, actuating the bit removal tool to disconnect the bit from the machine, sensing a plurality of characteristics of removing the bit from the machine, and determining that the bit has been disconnected from the machine based on the sensed characteristics.

17 Claims, 3 Drawing Sheets

SYSTEMS AND METHODS FOR COUNTING WORK MACHINE BIT REMOVAL

TECHNICAL FIELD

This disclosure relates generally, but not by way of limitation, to work machines for constructing, repairing, reconditioning, stabilizing, or taking-up road or like surfaces. More particularly, this disclosure relates to apparatus, systems, and methods for counting cutting bits removed from rotors of such machines.

BACKGROUND

Paving machines such as cold planer and rotary mixer machines include a rotor that cuts or mixes the ground or asphalt. The rotor includes bits mounted to a bit holder at the outer surface of the rotor, so that the bits engage with the ground when the rotor is lowered. This cutting action wears rapidly on the bits, such that they require frequent replacement, in some examples as frequently as every few hours. Operators and owners of such work machines may benefit from methods and systems that detect and record cutting bit consumption.

U.S. Pub. No. 2019/0184534A1, entitled "TOOL FOR INSTALLING A BIT ON AND/OR DEINSTALLING A BIT FROM A BIT HOLDER SYSTEM OF A MILLING MACHINE" discloses a tool for installing a bit on and/or deinstalling a bit from a bit holder system of a milling machine, in particular a road milling machine, having at least one initiator with which installation and/or deinstallation of a bit is initiated.

SUMMARY OF THE INVENTION

As work machines and associated systems become increasingly digital and enabled with various data communication systems, the industry has seen a push to provide more machine diagnostic information to machine operators and owners. Machine diagnostic information and other data can be used for service information, product support machine troubleshooting, machine population trends or even predictive wear analysis. Capturing and communicating data related to machine parts that wear in service may be employed, for example, to provide guidance when a part needs to be replaced even before the failure, which, in turn, may reduce machine down time.

Rotor bits for various types of work machines can represent the highest volume of consumable parts on such machines. As a result, machine operators and owners may benefit from devices and systems that accurately detect and record bit consumption. Once this element of machine operation is detected and recorded, the resultant data can be associated with various relevant parameters, including, for example, tracking bit consumption by job site and/or by operator.

In an example, a method of removing cutting bits from a milling work machine includes engaging a cutting bit connected to a rotary drum of the machine with a bit removal tool, actuating the bit removal tool to disconnect the bit from the machine, sensing a plurality of characteristics of removing the bit from the machine, and determining that the bit has been disconnected from the machine based on the sensed characteristics.

In an example, a system for removing cutting bits from a work machine includes a bit removal tool and a controller. The bit removal tool includes a movable bit removal structure configured to engage a cutting bit connected to the work machine, an actuator operatively connected and configured to displace the bit removal structure to remove the bit from the machine, and an encoder that senses a displacement distance of the actuator. The displacement distance of the actuator is indicative of a distance the movable bit removal structure is displaced by the actuator. The controller is communicatively connected to the linear encoder and configured to determine that the bit has been disconnected from the machine based at least on determining that the sensed displacement distance is greater than or equal to a threshold distance.

These and other examples and features of the present devices, systems, and methods will be set forth in part in the following Detailed Description. This overview is intended to provide a summary of subject matter of the present patent application. It is not intended to provide an exclusive or exhaustive removal of the invention. The detailed description is included to provide further information about the present patent application.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1A:
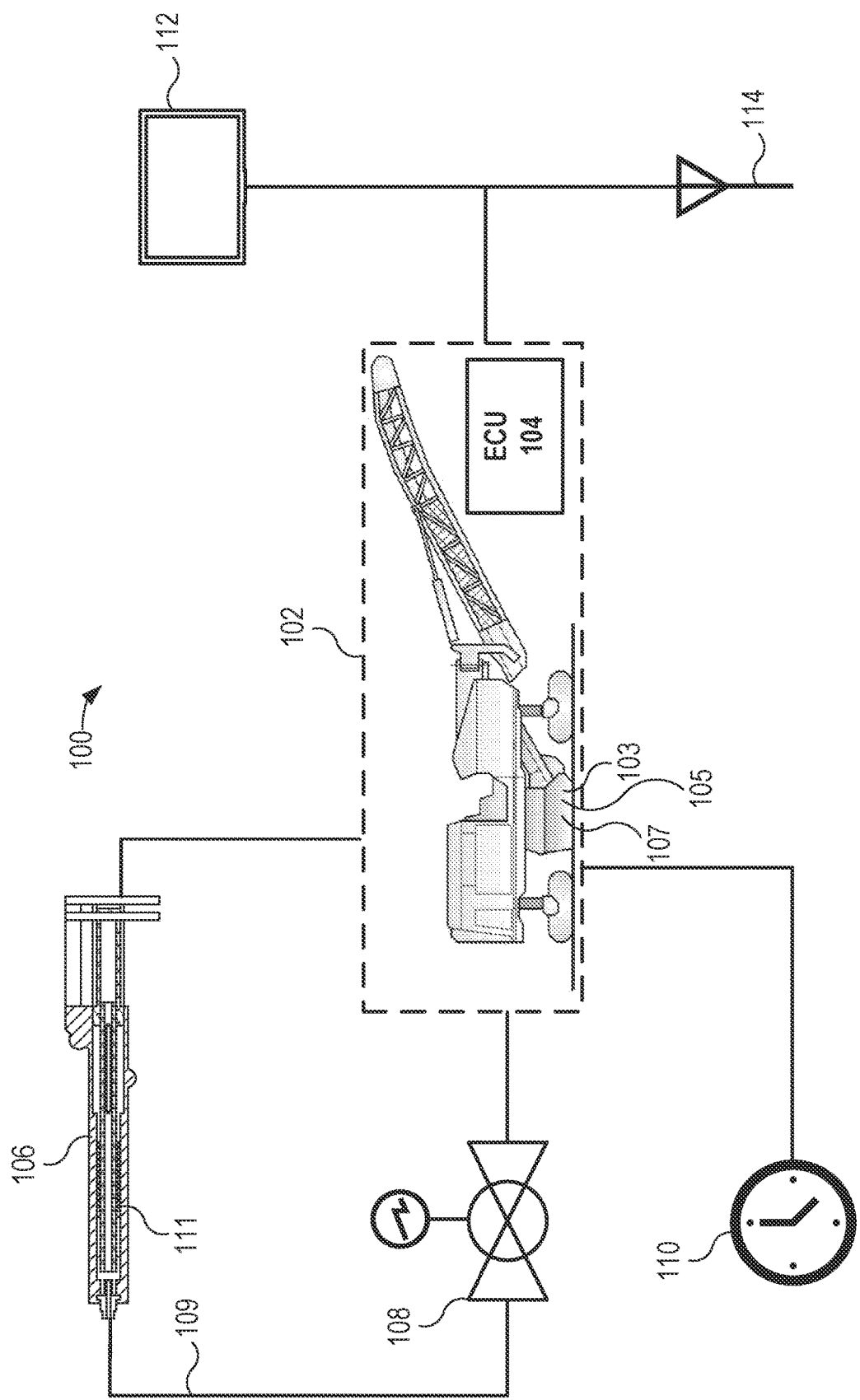
FIG. 1A schematically depicts an example rotor bit removal system in accordance with this disclosure.

FIG. 1A schematically depicts an example rotor bit removal system 100 in accordance with this disclosure. Example system 100 includes work machine 102 having electronic control unit (ECU) 104, bit removal tool 106, pressure sensor 108, timer 110, display 112, and transceiver 114. Work machine 102 is a milling machine, which is sometimes referred to as a cold planer. Work machine 102 is configured to traverse over a surface such as a roadway, parking lot, concreate pathway, as examples, to cut, grind, and remove pieces or parts of the surface over which the machine traverses. Work machine 102 uses a large rotating drum 103 to remove and grind the road surface. The rotating drum includes scrolls of cutting bit holders 105, The tool holders on the drum hold cutting bits 107, which can be removed by bit removal tool 106 and replaced as they, wear out. Rotor bits for work machine 102 can represent the highest volume of consumable parts on the machine and system 100 is therefore advantageously configured to automatically monitor and track the consumption of cutting bits of work machine 102. Although the example of FIGS. 1A and 1B includes milling work machine 102, examples according to this disclosure may be applicable to any cold planer, rotary mixer, milling machine, or other machinery involving cutting bits which require periodic removal and replacement.

Machine 102 includes ECU 104. An electronic control unit (ECU) can be an embedded system that controls machine electrical systems and/or other subsystems of the machine. In examples, machine 102 can include a number of electronic control units, including, for example an electronic/engine control module, powertrain control module, transmission control module, brake control module, suspension control module, among other examples. ECU 104 is communicatively connected and configured to send and receive data, sensor or other analog or digital signals, and other information to/from bit removal tool 106, pressure sensor 108, timer 110, display 112, and transceiver 114.

As described in more detail below, ECU 104 of system 100 is configured to automatically count the number of cutting bits removed from work machine 102 based on a plurality of characteristics of removing a cutting bit from the machine. For example, ECU 104 (or another controller, computer, processor, etcetera included in or communicatively connected to work machine 102) can be configured to automatically count the number of cutting bits removed from work machine 102 based on one or more of cutting bit displacement, bit removal load, bit removal cycle time, and cutting bit and bit holder connectivity.

ECU 104 can include software, hardware, and combinations of hardware and software configured to execute a number of functions attributed to the components in the disclosed examples. ECU 104 can be an analog, digital, or combination analog and digital controllers including a number of components. As examples, ECU 104 can include integrated circuit boards or ICB(s), printed circuit boards PCB(s), processor(s), data storage devices, switches, relays, etcetera. Examples of processors can include any one or more of a microprocessor, a controller, a digital signal processor (DSP), an application specific integrated circuit (ASIC), a field-programmable gate array (FPGA), or equivalent discrete or integrated logic circuitry.

ECU 104 may include storage media to store and/or retrieve data or other information, for example, signals or other information from one or more of bit removal tool 106, pressure sensor 108, timer 110, display 112, and transceiver 114. Examples of non-volatile storage devices include magnetic hard discs, optical discs, floppy discs, flash memories, or forms of electrically programmable memories (EPROM) or electrically erasable and programmable (EEPROM) memories. Examples of volatile storage devices include random access memories (RAM), dynamic random access memories (DRAM), static random access memories (SRAM), and other forms of volatile storage devices. The data storage devices can be used to store program instructions for execution by processor(s) of, for example, ECU 104.

ECU 104 can be configured to communicate with bit removal tool 106, pressure sensor 108, timer 110, display 112, and transceiver 114 via various wired or wireless communications technologies and components using various public and/or proprietary standards and/or protocols. Examples of transport mediums and protocols for electronic communication between components of system 100 include Controller Area Network (CAN) protocol, Ethernet, Transmission Control Protocol/Internet Protocol (TCP/IP), 802.11 or Bluetooth, or other standard or proprietary transport mediums and communication protocols.

Example bit removal tool 106 is a tool that is employed by an operator to remove cutting bits from the rotary drum of work machine 102. To assist operators, bit removal tool 106 can be connected to a power source, which powers operation of jaws of tool 106 to remove cutting bits from machine 102. In the example of FIG. 1, bit removal tool 106 is connected to and driven by a hydraulic line/system of work machine 102. In other examples, bit removal tool 106 can be connected to a hydraulic line/system separate from machine 102. Additionally, a bit removal tool in accordance with examples of this disclosure can be connected to and driven by another type of power source/drive system, including, for example, a different type of fluid drive system 109 like a pneumatic system or an electrically powered drive system 111 like an electric motor. In the case of employing an electrical/electro-mechanical drive system, such an electrically powered drives can be powered by a battery, which can be integrated with or separate from the bit removal tool.

Figure 1B:
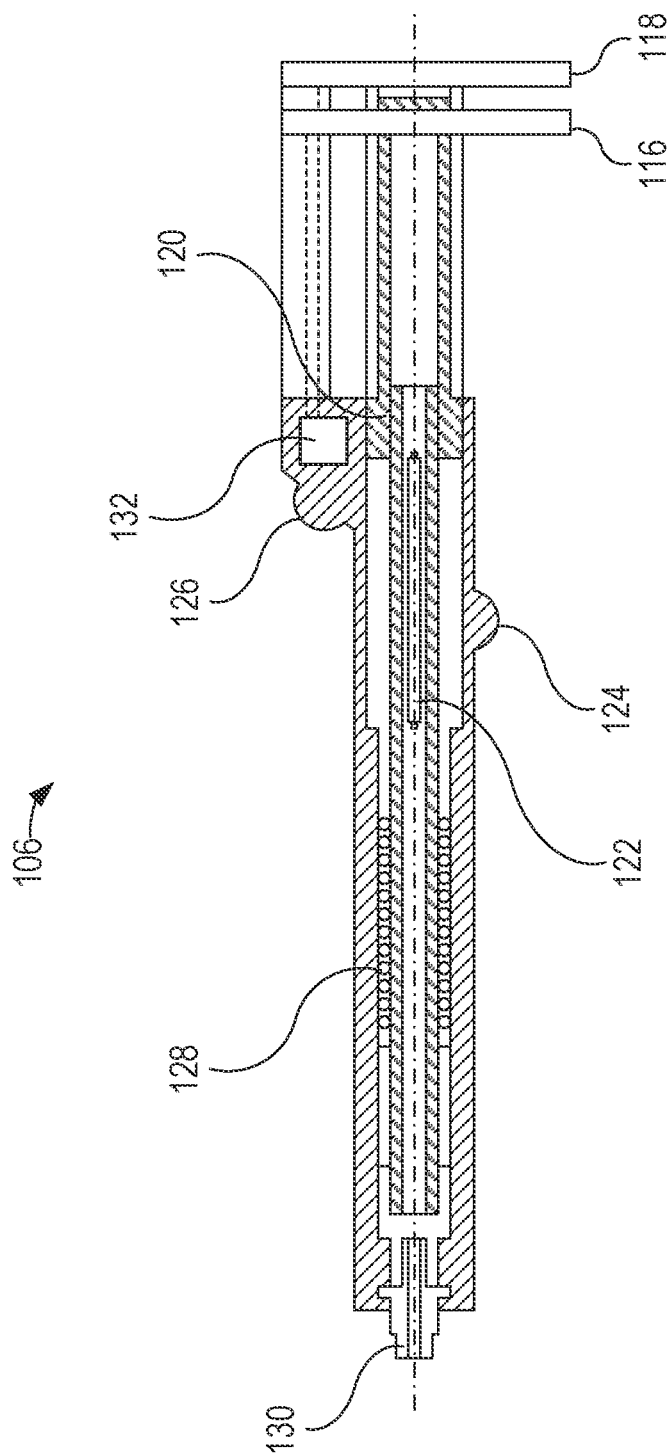
FIG. 1B is a section elevation view of example bit removal tool of FIG. 1A.

FIG. 1B is a section elevation view of example bit removal tool 106. In FIG. 1B, bit removal tool 106 includes first and second jaws 116, 118, linear actuator 120, linear encoder 122, first and second input controls 124, 126, spring 128, coupling 130, and conductivity and/or resistivity sensor 132. Coupling 130 can connect bit removal tool 106 to a hydraulic line/system of work machine 102 to cause linear actuator 120 to displace first jaw 116 relative to second jaw 118 to remove a cutting bit from work machine 102.

For example, bit removal tool 106 can be positioned by an operator to engage a cutting bit on machine 102. Second jaw 118 can be connected to a stationary flange or other structure on a bit holder to which the cutting bit is connected and first jaw 116 can be connected to/positioned to engage a flange or other structure of cutting bit to be removed. After positioning bit removal tool 106 to remove the bit from machine 102, the operator can commence the bit removal by engaging first input control 124, which actuates linear actuator 120 to displace first jaw 116 relative to second jaw 118. Displacement of first jaw 116 causes the cutting bit to be drawn out of and removed from the stationary bit holder on the rotary drum of work machine 102. In examples, spring 128 can be positioned, sized, and configured to return linear actuator 120 and thereby first jaw 116 to an initial (unactuated) position.

In addition to first input control 124, which actuates tool 106 to commence a bit removal, bit removal tool 106 includes second input control 126. In examples, second input control 126 can control a number of different functions. In an example, second input control 126 includes one or more buttons or other inputs by which an operator can reposition the rotor drum of work machine 102 to access addition cutting bits. In an example, second input control 126 includes one input to rotate the drum clockwise and another input to rotate the drum counter-clockwise. The input control configuration of a bit removal tool in accordance with this disclosure may vary from the example of FIGS. 1A and 1B, including differently configured input controls (e.g., toggles versus buttons), the number of input controls, and the arrangement of input controls on the tool.

Bit removal tool 106 also includes linear encoder 122. Linear encoder 122 is arranged and connected to tool 106 to measure a displacement distance of actuator 120, which can be indicative of the displacement distance of a cutting bit removed by tool 106. Linear encoder 122 is configured to transmit bit displacement measurements to ECU 104 and can include a variety of different types of incremental or absolute encoders including optical, magnetic, inductive, capacitive and eddy current encoders. Coupling 130 (or another coupling or other structure), can facilitate connecting linear encoder 122 to a power source, including dedicated AC or DC power or a battery.

Although bit removal tool 106 is described and depicted as including a hydraulic piston/cylinder linear actuator and linear encoder to cause the tool jaws to displace and sense such displacement, in other examples according to this disclosure, a bit removal tool could include different types of actuators and encoders. For example, various types of actuators could be employed, including rack and pinion, traveling-nut/lead screw actuator, worm gear drive, as examples. In an example, a bit removal tool in accordance with this disclosure can include a screw jack or a slider-crank actuator, both of which can convert rotary motion into linear motion of jaws of the tool. In both of these cases, a rotary encoder could be used to measure the rotational displacement of the actuator, which equates to the distance the cutting bit is linearly displaced as the bit is removed from machine 102.

Referring again to FIG. 1A, bit removal system 100 includes pressure sensor 108 and timer 110. Pressure sensor 108 is fluidically connected in-line with bit removal tool 106. Additionally, pressure sensor 108 is communicatively connected to ECU 104 of work machine 102. More generally, pressure sensor 108 is arranged and configured to detect/measure the load on tool 106 caused by removing a bit from work machine 102 and to communicate the detected/measured load to ECU 104. For example, pressure sensor 108 can periodically or continuously detect/measure pressure in the hydraulic line/system to which bit removal tool 106 is connected and communicate the hydraulic pressure to ECU 104. In examples, pressure sensor 108 can be a hydraulic valve and pressure transducer.

In some examples according to this disclosure, an example bit removal system can include tool load sensors/detectors different than pressure sensor 108 of example system 100 of FIG. 1A. For example, system 100 employs a hydraulically powered tool 106 to remove bits from work machine 102. In other examples, a bit removal system in accordance with this disclosure can include a bit removal tool with an electric actuator like, e.g., a linear and/or rotary actuator driven by an electric motor. Such an example bit removal system can include an electric tool load sensor, for example, a current or voltage sensor that measures the load on the motor of the actuator caused by the bit removal tool extracting a bit from a work machine.

ECU 104 of system 100 (or another controller, computer, processor, etcetera included in or communicatively connected to work machine 102) is configured to automatically count the number of cutting bits removed from work machine 102 based on a plurality of characteristics of removing a cutting bit from a work machine. For example, ECU 104 can be configured to automatically count the number of cutting bits removed from work machine 102 based on a sensed/measured displacement distance of a tool removal structure, e.g., one or more of jaws 116, 118 of bit removal tool 106, which can be indicative of the displacement distance of a cutting bit removed by tool 106.

In addition to bit displacement distance, ECU 104 can be configured to automatically count the number of cutting bits removed from work machine 102 based on a bit removal load. For example, the pressure in the hydraulic system to which tool 106 is connected can be sensed/measured by pressure sensor 108 and ECU 104 can compare the sensed/measured pressure to a threshold pressure indicative of a load on tool 106 caused by the tool removing a cutting bit from work machine 102. Other implementations of counting bit removals from a work machine based on a bit removal load are possible.

For example, a bit removal tool in accordance with examples of this disclosure can be connected to and driven by another type of power source than the example of FIGS. 1A and 1B, including, for example, a different type of fluid drive system like a pneumatic system or an electric power source like an electric motor. As an example, a bit removal system in accordance with this disclosure can include a bit removal tool with an electric actuator like, e.g., a linear actuator driven by an electric motor. Such an example bit removal system can include an electric tool load sensor, for example, a current or voltage sensor that measures the load on the motor of the actuator caused by the bit removal tool extracting a bit from a work machine.

In addition to bit displacement distance and bit removal load, ECU 104 can be configured to automatically count the number of cutting bits removed from work machine 102 based on a bit removal cycle time. The bit removal cycle time can be defined in a number of ways, but, generally, is the duration of time to remove a cutting bit from work machine 102. In an example, timer 110 can be configured to sense/measure a duration of time, e.g., duration of time of a full actuation cycle of bit removal tool 106 or from the occurrence of a previous bit removal count to the next bit removal count recorded by ECU 104. ECU 104 can include or be communicatively connected to timer 110 and can compare the duration of time measured/sensed by timer 110 to a predetermined bit removal cycle time indicative of a minimum possible time between cutting bit removals.

In an example, bit removal tool 106 is configured to displace first jaw 116 relative to second jaw 118 only as long as an operator continues to depress first input control 124 of tool 106. In such an example, timer 110 can sense/measure the duration of time an operator engages first input control 124 and ECU 104 can compare the duration of time the operator engages first input control 124 to a predetermined time known to be required to displace first jaw 116 relative to second jaw 118 enough to remove a cutting bit from machine 102.

In addition to bit displacement distance, bit removal load, and bit removal cycle time, ECU 104 can be configured to automatically count the number of cutting bits removed from work machine 102 based on detecting a connection/disconnection between the cutting bit and bit holder. In various examples, the rotor drum of machine 102 includes cutting bits mounted to a bit holder at the outer surface of the rotor. The cutting bits and bit holders are generally constructed from metallic, electrically conductive materials. On condition that bit removal tool 106 is positioned to engage a cutting bit and bit holder, tool 106 can be configured to create an electrical circuit between the cutting bit and tool holder of machine 102.

For example, bit removal tool 106 can include a conductivity and/or resistivity sensor 132, which senses/measures the conductivity and/or resistivity of the electrical circuit between the cutting bit and holder. ECU 104 can include or be communicatively connected to sensor 132 and can compare the resistivity/conductivity measured/sensed by sensor 132 to a predetermined threshold. For example, ECU 104 can monitor the conductivity measured/sensed by sensor 132 and determine the bit has been removed from the bit holder if the conductivity drops to or near zero. In another example, ECU 104 can monitor the resistivity measured/sensed by sensor 132 and determine the bit has been removed from the bit holder if the resistivity increases to or above a predetermined threshold resistivity.

Referring again to FIG. 1A, example rotor bit removal system 100 includes display 112 and transceiver 114. Display 112 and transceiver 114 can be included in or communicatively connected to ECU 104 of work machine 102. In examples, display 112 can be a variety of types of display devices including output displays and input/output touchscreen displays. Additionally, in other examples, different types of output devices may be employed. Transceiver 114 can be a variety of devices configured to transmit and receive signals, data, and/or other information to/from various devices communicatively connected to transceiver 114.

The bit removal count determined, stored, tracked, monitored, etcetera by system 100, and, in particular, ECU 104 can be communicated to users/operators via display 112 and can also be communicated to other devices, systems, etc. via transceiver 114. For example, the running bit removal count for work machine 102 can be stored in memory of ECU 104. This count could then be displayed in a variety of formats/interfaces via display 112. Additionally, display 112 can be employed by operators to reset the count and/or do some count manipulation such as sorting by job site, operator, project, day, week, as examples. ECU 104 may also transmit a final or running bit removal count to other parties or devices via transceiver 114. For example, ECU 104 can transmit bit removal count data to a back office data analysis/mining system to track/determine/predict/trigger bit replenishment orders, service information, product support machine troubleshooting, machine population trends, and/or predictive cutting bit wear analysis, as examples.

INDUSTRIAL APPLICABILITY

Figure 2:
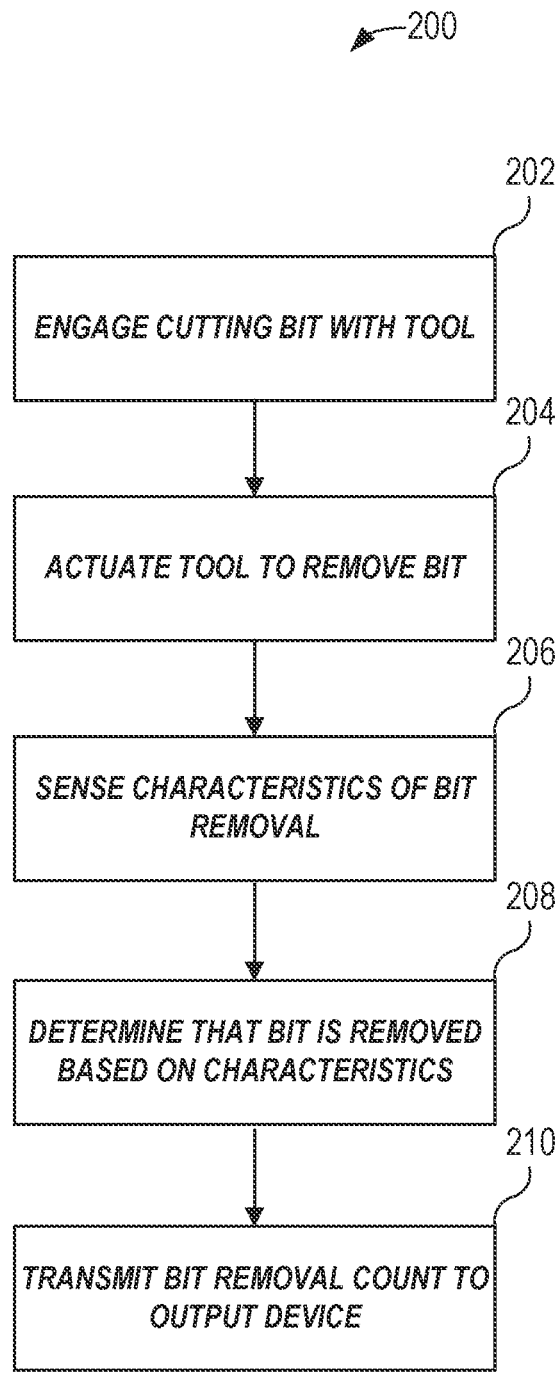
FIG. 2 is a flowchart depicting a method of counting the number of rotor bits removed from a work machine in accordance with example(s) of this disclosure.

FIG. 2 is a flow chart depicting a method 200 of automatically detecting and counting cutting bit removals from a work machine. Method 200 includes engaging a cutting bit connected to a rotary drum of the machine with a bit removal tool (202), actuating the bit removal tool to disconnect the bit from the machine (204), sensing a plurality of characteristics of removing the bit from the machine (206), determining that the bit has been disconnected from the machine based on the sensed characteristics (208), and transmitting a bit removal numerical count to an output device (210).

In an example, an operator of system 100 may employ bit removal tool 106 to engage a cutting bit on the rotary drum of milling work machine 102 (202). In some cases, prior to positioning and configuring tool 106 to remove a cutting bit, the operator can connect tool 106 to a hydraulic system of work machine 106 via coupling 130 and can also employ second input control 126 to rotate the rotary drum to select a particular cutting bit or group of bits to remove from machine 106. Bit removal tool 106 can be positioned by the operator to engage a cutting bit on machine 102. The operator can, for example, connect second jaw 118 to a stationary flange or other structure on a bit holder to which the cutting bit is connected. First jaw 116 of tool 106 can be connected to/positioned to engage a flange or other structure of cutting bit to be removed. After positioning bit removal tool 106 to remove the bit from machine 102, the operator can commence the bit removal by engaging first input control 124, which actuates linear actuator 120 to displace first jaw 116 relative to second jaw 118. Displacement of first jaw 116 causes the cutting bit to be drawn out of and removed from the stationary bit holder on the rotary drum of work machine 102.

During this bit removal cycle executed by the operator, a plurality of characteristics of removing the bit from machine 106 can be sensed/measured/detected/etcetera (204). For example, system 100 can sense/measure: a distance a bit removal distance; a load on bit removal tool 106; a bit removal cycle time, and/or connectivity/connection between cutting bit and bit holder on machine 106. In an example, linear encoder 122 of bit removal tool 106 measures a displacement distance of actuator 120 as the actuator displaces first jaw 116 relative to second jaw 118. The displacement distance of actuator 120 and first jaw 116 is indicative of the displacement distance of the cutting bit being removed by the operator. Pressure sensor 108 is arranged and configured to detect/measure the load on tool 106 caused by removing the bit from work machine 102. In an example, pressure sensor 108 periodically or continuously detects/measures pressure in the hydraulic line/system to which bit removal tool 106 is connected. Bit removal system 100 includes timer 110, which is configured to sense/measure a bit removal cycle time. In an example, timer 110 can be configured to sense/measure a duration of time, e.g., from the occurrence of a previous bit removal count to the next bit removal count recorded by ECU 104. Additionally, conductivity and/or resistivity sensor 132 periodically or continuously senses/measures the conductivity and/or resistance of an electrical circuit between the cutting bit and bit holder on machine 102.

Without direct input or interaction from the operator removing the cutting bit from work machine 102, bit removal system 100 can determine that the bit has been disconnected from the machine based on the sensed characteristics (208) and increment a numerical count of an electronic bit removal counter by one after determining that the bit has been disconnected from the machine. In an example, ECU 104 can be configured to automatically count the number of cutting bits removed from work machine 102 based on a sensed/measured displacement distance of a tool removal structure, e.g., one or more of jaws 116, 118 of bit removal tool 106, which can be indicative of the displacement distance of a cutting bit removed by tool 106. ECU 104 can receive the bit displacement distance from linear encoder 122 of tool 106. ECU 104 can compare the bit displacement distance to a predetermined distance threshold to determine if the bit has been successfully removed from machine 106. For example, ECU 104 can determine if the sensed bit displacement distance is greater than or equal to a predetermined distance threshold. In some cases, cutting bits are mounted to work machines via a standard size bit shank. In such cases, the predetermined distance threshold can be equal to or greater than the size of the cutting bit shank.

ECU 104 can also be configured to automatically count the number of cutting bits removed from work machine 102 based on a bit removal load. ECU 104 can determine whether or not a bit has been removed based on bit removal load in addition to or independent of bit displacement distance. In an example, ECU 104 can compare a pressure sensed/measured by pressure sensor 108 to a threshold pressure indicative of a load on tool 106 caused by the tool removing a cutting bit from work machine 102.

In addition to bit displacement distance and bit removal load, ECU 104 can be configured to automatically count the number of cutting bits removed from work machine 102 based on a bit removal cycle time. ECU 104 can determine whether or not a bit has been removed based on bit removal cycle time in addition to or independent of bit removal load and/or bit displacement distance. In an example, timer 110 senses/measures a duration of time, e.g., duration of time of a full actuation cycle of bit removal tool 106 or from the occurrence of a previous bit removal count to the next bit removal count recorded by ECU 104. ECU 104 compares the duration of time measured/sensed by timer 110 to a predetermined bit removal cycle time.

In addition to bit displacement distance bit removal load, and bit removal cycle time, ECU 104 can be configured to automatically count the number of cutting bits removed from work machine 102 based on connectivity/connection between cutting bit and bit holder on machine 106. For example, ECU 104 can monitor the conductivity measured/sensed by sensor 132 and compare the measured/sensed conductivity to a conductivity threshold. Additionally, or alternatively. ECU 104 can monitor the resistance measured/sensed by sensor 132 and compare the measured/sensed resistance to a resistance threshold.

In an example, ECU 104 determines if the cutting bit has been removed from work machine 106 by determining that the sensed/measured bit displacement distance is greater than or equal to the distance threshold, the sensed/measured bit removal load is greater than or equal to a bit removal load threshold, the sensed/measured duration of time to remove the bit is greater than or equal to the bit removal cycle time, the sensed/measured conductivity between bit and bit holder is approximately equal to zero, and/or the sensed/measured resistivity between bit and bit holder is greater than or equal to a threshold resistance. ECU 104 can validate a bit removal based on one, all five, and/or different combinations of these bit removal characteristics.

In an example, ECU 104 first determines whether the sensed/measured bit displacement distance is greater than or equal to the distance threshold. If the measured distance is not greater than or equal to the threshold, ECU 104 can determine that the cutting bit has not been removed and a bit removal counter will not therefore be incremented. If the measured distance is greater than or equal to the threshold, ECU 104 then determines whether the sensed/measured bit removal load is greater than or equal to a bit removal load threshold. If the measured load is not greater than or equal to the threshold, ECU 104 can determine that the cutting bit has not been removed and a bit removal counter will not therefore be incremented. If the measured load is greater than or equal to the threshold, ECU 104 then determines whether the sensed/measured duration of time to remove the bit is greater than or equal to the bit removal cycle time.

In an example, the duration of time sensed/measured by timer 110 can be measured from a previously recorded bit removal to a time at which tool 106 has completed its bit removal cycle, e.g. a time at which first jaw 116 reaches its maximum/proscribed displacement. Alternatively, the duration of time sensed/measured by timer 110 can be the duration of time the operator engages first input control 124 of bit removal tool 106. If the measured time is not greater than or equal to the bit removal cycle time threshold, ECU 104 can determine that the cutting bit has not been removed and a bit removal counter will not therefore be incremented. If the measured time is greater than or equal to the threshold, ECU 104 then compares the sensed/measured conductivity and/or resistivity between the bit and bit holder (or other portion of machine 102 contacting the bit) to one or more thresholds. For example, ECU 104 can monitor the conductivity measured/sensed by sensor 132 and determine the bit has been removed from the bit holder if the conductivity drops to or near zero. In another example, ECU 104 can monitor the resistivity measured/sensed by sensor 132 and determine the bit has been removed from the bit holder if the resistivity increases to or above a predetermined threshold resistivity.

Referring again to example method 200 of FIG. 2, after executing a bit removal and incrementing a bit removal counter, system 100 can transmit a bit removal numerical count to an output device (210). For example, ECU 104 transmits the bit removal count to display 112, via which users/operators can view/monitor the rolling count. Additionally, or alternatively. ECU 104 communicates the bit removal count to a local or remote back-office or other system via transceiver 114.

In the foregoing Detailed Description, it can be seen that various features are grouped together in a single example for the purpose of streamlining the disclosure. This method of disclosure is not to be interpreted as reflecting an intention that the claimed examples require more features than are expressly recited in each claim. Rather, as the following claims reflect, inventive subject matter lies in less than all features of a single disclosed example. Thus, the following claims are hereby incorporated into the Detailed Description, with each claim standing on its own as a separate example.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific examples. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific examples. However, the benefits, advantages, solutions to problems, and any feature(s) that may cause any benefit, advantage, or solution to occur or become more pronounced are not to be construed as a critical, required, or essential feature of any or all the claims. Moreover, the particular examples disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular examples disclosed above may be altered or modified and all such variations are considered within the scope of the disclosed subject matter. Accordingly, the protection sought herein is as set forth in the claims below.

What is claimed is:

1. A method of removing cutting bits from a work machine, the method comprising:
    engaging a cutting bit connected to a rotary drum of the machine with a movable bit removal structure of a bit removal tool;
    actuating the bit removal tool to disconnect the bit from the machine by displacing the movable bit removal structure;
    sensing, with an encoder of the bit removal tool, a distance that the movable bit removal structure is displaced; and
    determining that the bit has been disconnected from the machine based on the sensed distance that the movable bit removal structure is displaced.

2. The method of claim 1, wherein:
    determining that the bit has been disconnected from the machine comprises determining that the sensed distance is greater than or equal to a threshold distance.

3. The method of claim 2, wherein:
the threshold distance is greater than or equal to a predetermined dimension of the bit.

4. The method of claim 3, wherein:
the predetermined dimension of the bit is a length of a shank of the bit.

5. The method of claim 1, further comprising:
incrementing a numerical count of an electronic bit removal counter by one after determining that the bit has been disconnected from the machine.

6. The method of claim 5, further comprising:
transmitting the numerical count to an output device connected to, adjacent to, or remote from the work machine.

7. A method of removing cutting bits from a work machine, the method comprising:
engaging a cutting bit connected to a rotary drum of the machine with a movable bit removal structure of a bit removal tool;
actuating the hit removal tool to disconnect the bit from the machine by displacing the movable bit removal structure;
sensing, with a sensor of the bit removal tool, a connection between the bit and a bit holder of the machine; and
determining that the bit has been disconnected from the machine based on the sensed connection between the bit and a bit holder of the machine.

8. The method of claim 7, wherein:
sensing the connection between the hit and the hit holder comprises sensing at east one of electrical resistance and electrical conductance between the bit and the bit holder.

9. The method of claim 8, wherein:
determining that the bit has been disconnected from the machine comprises at least one of:
determining that the sensed resistance is greater than or equal to a threshold resistance; and
determining that the sensed conductance is approximately equal to zero.

10. The method of claim 7, further comprising:
incrementing a numerical count of an electronic bit removal counter by one after determining that the bit has been disconnected from the machine.

11. The method of claim 10, further comprising:
transmitting the numerical count to an output device connected to, adjacent to, or remote from the work machine.

12. A system for removing cutting bits from a work machine, the system comprising:
a bit removal tool comprising:
movable bit removal structure configured to engage a cutting bit connected to the machine;
an actuator operatively connected and configured to displace the bit removal structure to remove the bit from the machine; and
an encoder that senses a displacement distance of the actuator, the displacement distance of the actuator being indicative of a distance the bit removal structure is displaced by the actuator; and
a controller communicatively connected to the encoder and configured to determine that the bit has been disconnected from the machine based at least on determining that the sensed displacement distance is greater than or equal to a threshold distance.

13. The system of claim 12, wherein:
the threshold distance is greater than or equal to a length of a shank of the bit.

14. The system of claim 12, further comprising a load sensor communicatively connected to the controller and configured to sense a load on the bit removal structure, and wherein:
the controller determines that the bit has been disconnected from the machine based on determining that the sensed load is greater than or equal to a threshold load.

15. The system of claim 14, wherein:
the actuator is a hydraulic actuator;
the load sensor is a pressure sensor that senses a pressure of a hydraulic system connected to the hydraulic actuator; and
the controller determines that the bit has been disconnected from the machine based on determining that the sensed pressure is greater than or equal to a threshold pressure.

16. The system of claim 14, wherein:
the actuator is an electric actuator;
the load sensor is a current or voltage sensor that senses a current or voltage of an electric drive system connected to the electric actuator; and
the controller determines that the bit has been disconnected from the machine based on determining that the sensed current or voltage is greater than or equal to a threshold current or voltage.

17. The system of claim 12, further comprising a timer communicatively connected to the controller and configured to sense a duration of time to remove the bit from the machine, and wherein:
the controller determines that the bit has been disconnected from the machine based on determining that the sensed duration of time is greater than or equal to a predetermined bit removal cycle time.

* * * * *